No. 621,984. Patented Mar. 28, 1899.
O. W. WHITEHEAD.
TROLLEY CATCHER.
(Application filed July 18, 1898.)
(No Model.) 3 Sheets—Sheet 1.

Witnesses:

Inventor.
O. W. Whitehead.
By R. J. McCarty
Attorney.

No. 621,984. Patented Mar. 28, 1899.
O. W. WHITEHEAD.
TROLLEY CATCHER.
(Application filed July 18, 1898.)
(No Model.) 3 Sheets—Sheet 2.
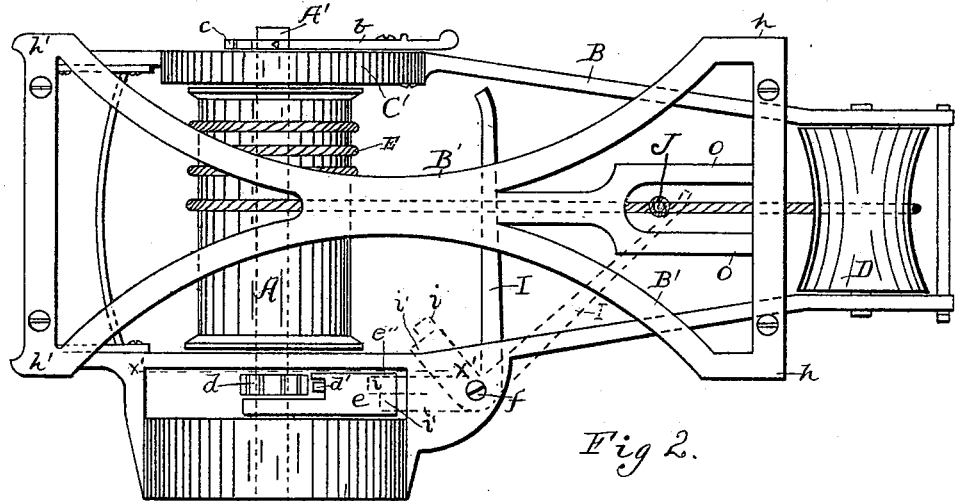
Fig 2.
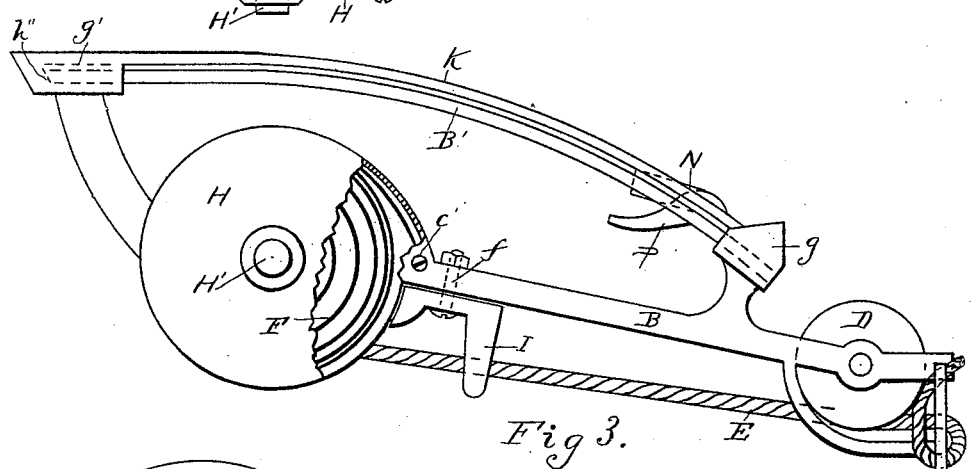
Fig 3.
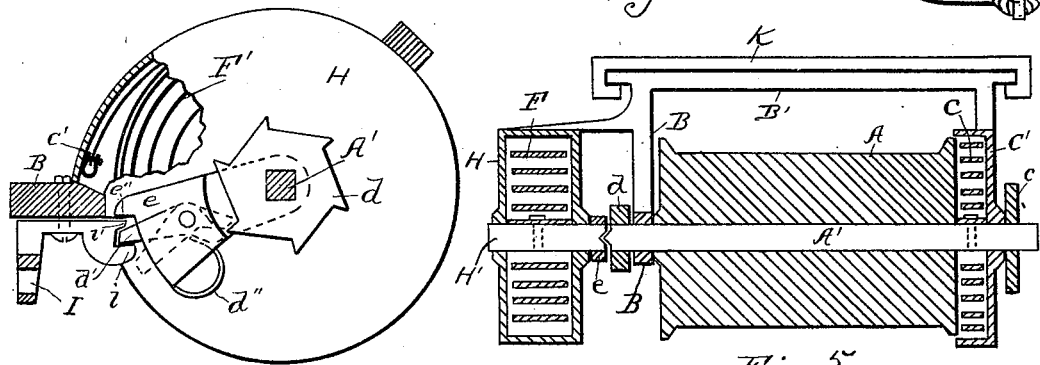
Fig 4. 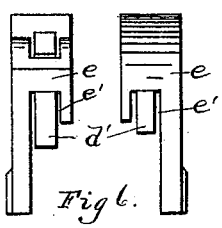 Fig 5.
Fig 6.
Witnesses:
Carl H. Noe.
Robert K. Rochester.
Inventor.
O. W. Whitehead
By R. J. McCarty
Attorney.

No. 621,984. Patented Mar. 28, 1899.
O. W. WHITEHEAD.
TROLLEY CATCHER.
(Application filed July 18, 1898.)

(No Model.) 3 Sheets—Sheet 3.

Witnesses:
Carl H. Moe
Robert K. Rochester

Inventor.
O. W. Whitehead.
By R. J. McCarty
Attorney.

THE NORRIS PETERS CO., PHOTO-LITHO., WASHINGTON, D. C.

UNITED STATES PATENT OFFICE.

OLIVER W. WHITEHEAD, OF DAYTON, OHIO.

TROLLEY-CATCHER.

SPECIFICATION forming part of Letters Patent No. 621,984, dated March 28, 1899.

Application filed July 18, 1898. Serial No. 686,224. (No model.)

*To all whom it may concern:*

Be it known that I, OLIVER W. WHITEHEAD, a citizen of the United States, residing at Dayton, in the county of Montgomery and State of Ohio, have invented certain new and useful Improvements in Trolley-Catchers; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to improvements in trolley-catchers; and it comprises the novel construction and arrangement of parts hereinafter more fully described.

The object of the invention is to comprise in one machine means for taking up the slack in the trolley-rope when the trolley is in an operative position, and, further, means for controlling or catching said trolley whenever it leaves the wire, and thereby preventing it from knocking against the wires and other obstructions. To the latter extent the present invention is an improvement of the trolley-reel and signaling device shown and described in my pending application, filed February 12, 1898, Serial No. 670,078.

Figure 1:
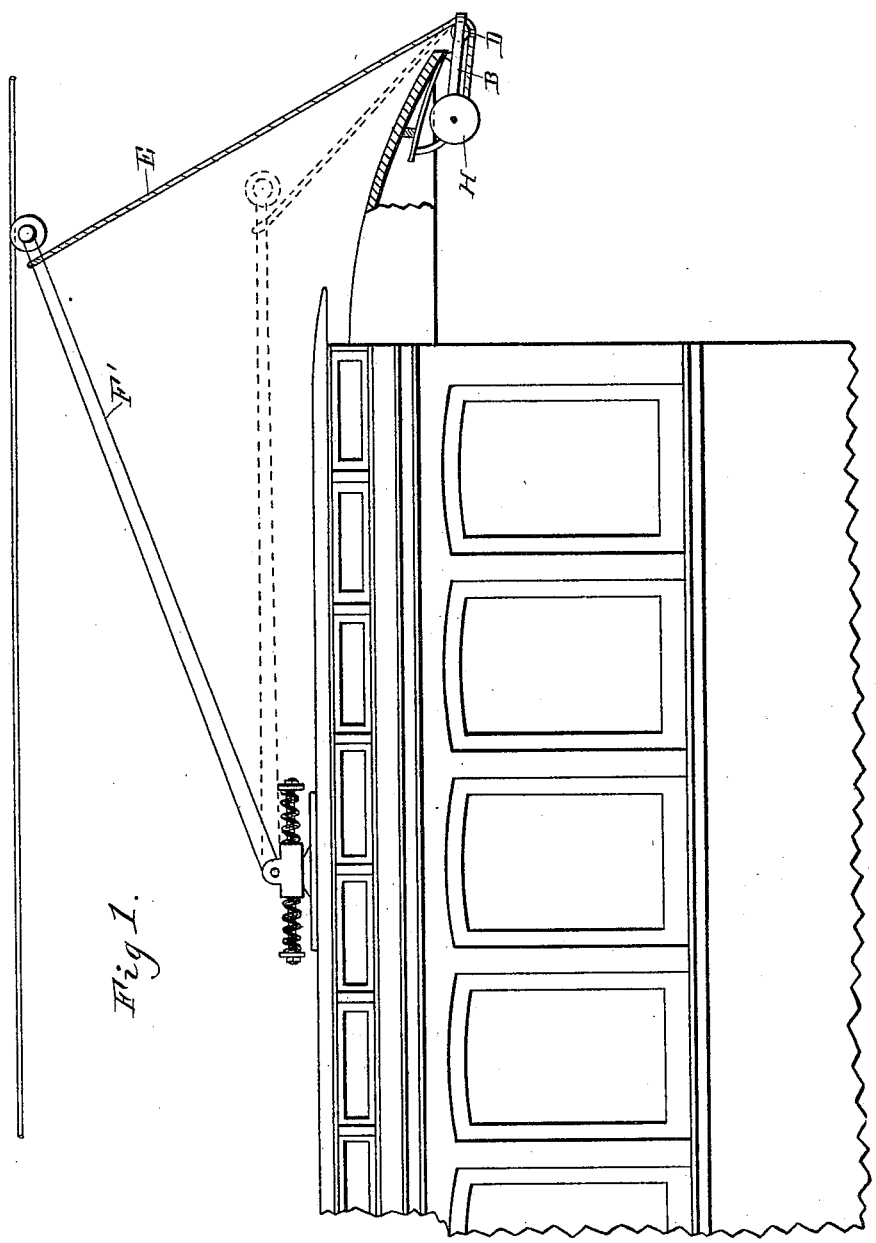
Figure 7:
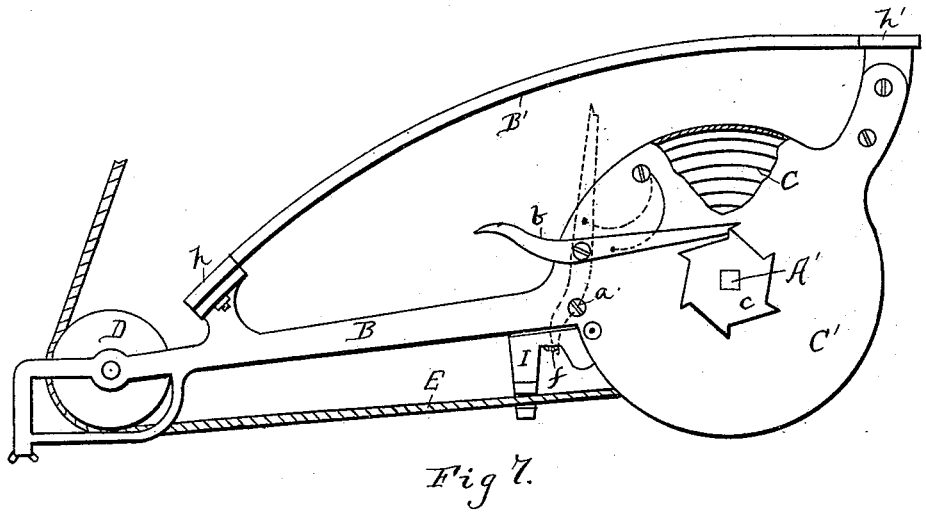
Figure 8:
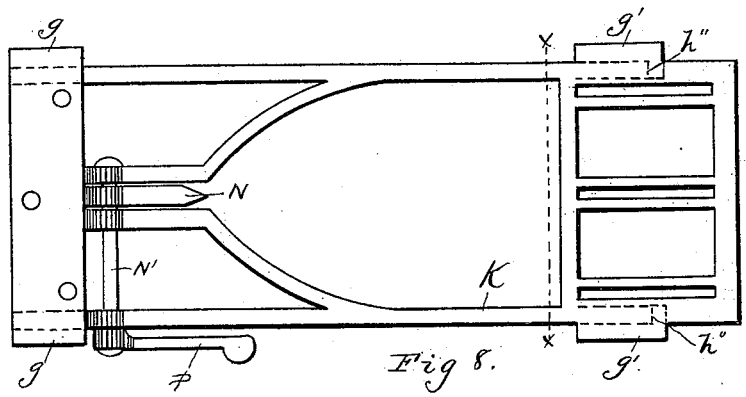
Figure 9:
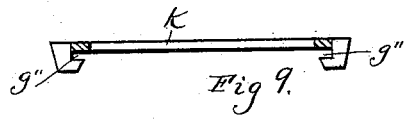
Figure 10:

In the accompanying drawings, Figure 1 is a side elevation of a portion of a car having my invention applied. Fig. 2 is an enlarged top plan view detached from the car. Fig. 3 is a side elevation with part of the spring-housing broken away. Fig. 4 is a section on the line $x'\ x'$ of Fig. 2. Fig. 5 is a sectional view taken on an axial line through the winding-spool and coöperating mechanism; Fig. 6, top and bottom views, respectively, of the dog and its support. Fig. 7 is an elevation of the side opposite that shown in Fig. 3. Fig. 8 is a top plan view of the frame attachable to the car and by which the device is supported. Fig. 9 is a cross-sectional view of Fig. 8 on the line $x\ x$. Fig. 10 is an elevation of the pivotal arm.

The winding-spool A is mounted between the sides B B of the frame and has its shaft A' journaled in said sides. A convolute spring C, Fig. 7, controls said spool to take up the slack in the trolley-rope E when the trolley is in an operative position. This spring C is housed in a casing C', which is an integral part of the frame or which may be attached to said frame. As shown in Fig. 7, the said spring has one end attached to the housing at $a$, and the other end is attached to the shaft A' of the spool, so that the said spool is normally under the control of the spring. This has the effect of keeping the trolley-rope from sagging.

$b$ designates a ratchet-pawl pivoted to the frame and engaging with a ratchet-wheel $c$ on the shaft A' to prevent any reverse movement of the spool when the spring C is being put under tension.

D designates a roller in the front end of the frame, over which the trolley-rope E passes to the spool. As before stated, the trolley-rope is normally under the control of the spring C; but whenever the trolley leaves the wire the spool becomes immediately under the control of a similar spring F of greater tension, which assumes control of the trolley-pole F' and draws it down to the position shown in dotted lines in Fig. 1. This spring F is inclosed in a housing H on the other side of the frame and is mounted on a short shaft H' in line with the spool-shaft A', but normally disconnected therefrom. The shaft H' is journaled in the sides of its inclosing case and has attached to it one end of the convolute spring F, the other end of which is attached to the housing at $c'$.

As before stated, the strength of spring F is greater than that of the spring C, and the said former spring is utilized for the specific purpose of taking control of the trolley-pole. The spool is put under the control of spring F for this purpose by means of clutch mechanism set in motion instantly by an up-pull of the trolley-rope due to a detachment of the trolley. This mechanism consists of a ratchet-wheel $d$, which is rigidly mounted on the spool-shaft A'. $d'$ is a dog pivoted to a rotating support or housing $e$, which is rigidly attached to the shaft H'. This ratchet-wheel $d$ and pawl or dog $d'$ constitute the clutch mechanism. The dog is normally held away from the wheel, and when released a spring $d''$ presses it in engagement with said wheel. The support $e$ has a slot $e'$ therein, into which the outer end of the dog projects, and the upper front of said support further has an extension or ledge $e''$, that projects out. These features are best shown in Figs. 2 and 6.

I designates a slotted or forked arm that lies parallel with the spool and in front thereof. This arm is pivoted at $f$ to a side of the frame and has its pivotal end turned and formed with two projections $i$ and $i'$, the former of which engages with the outer end of the dog $d'$ through the slot $e'$ and holds said dog out of engagement with the wheel $d$, and the latter projection—to wit, $i'$—engages the ledge $e''$ and holds the support $e$ against any movement. These parts $i$ and $i'$ of the forked arm are in a position to engage the dog $d'$ and the ledge $e''$ when the arm is in a position parallel with the spool, or nearly so, as shown in Fig. 2, and at which time the spool is alone under the control of spring C; but when the said parts $i$ and $i'$ are moved out of engagement with the dog and the ledge $e''$ the said dog is permitted to engage with the ratchet-wheel $d$, and the support $e$ is free to turn. The dog is first released to engage with the ratchet-wheel, thus putting the spool under the control of spring F, and the support $e$ is next released and the parts—namely, the spool, the shafts A' and H, and the support $e$—are permitted to turn. The arm I is moved to permit this operation by the trolley-rope, which passes through the forks of said arm. The rope has an enlargement J, that lies in the rear of the said arm. When the trolley becomes disconnected from the wire, the pole flying upward will pull said rope, and the movement thereof will quickly engage the enlargement J with the forks of the arm, moving said arm on its pivot, as shown in dotted lines, Fig. 2. During this movement the dog $d'$ is first released and allowed to instantly engage with the ratchet-wheel. The spool is at this moment under the control of spring F, but cannot rotate until the support $e$ is released, which occurs in an instant after the release of said dog. In other words, the projection $i$ is moved away from the dog just in advance of the movement of projection $i'$ away from the support $e$. This is an important feature of my invention and overcomes obstacles heretofore existing in all trolley-catchers that I am aware of. Owing to the rapidity in which the spool and the spring F move in opposite direction when disconnected it is necessary to engage the dog or pawl and ratchet-wheel before any movement occurs through the release of said spring; otherwise the movements of the spool and spring in opposite directions would prevent the pawl from engaging; but by keeping the rotating support $e$ under control any movement of the spring is prevented until the pawl has engaged. When the forked arm has partly moved, the dog is released, the support $e$ being the meanwhile held until the said arm is drawn back to the position in dotted lines, Fig. 2, at which time the said support is released and the spring permitted to expand.

The supporting-frame K (shown in Fig. 6) is secured to the roof of the platform of a car. This frame at each side $g$ of the front end and on each side $g'$ near the rear end is provided with slots $g''$ (shown plainly in Fig. 7) and in which the edges $h$ $h'$ of the top frame B', Fig. 2, slide and are supported.

A finger N engages with the frame B' between the parts $o$ $o$ and prevents the frame from slipping in an outward direction. The finger N is fast on the rod N' and may be turned, by means of a handle $p$, to a position to admit of the frame B' being placed in position. The frame B' when supported in frame K is prevented from slipping inwardly by the projections $h'$ engaging with the rear walls $h''$ of the slots.

Having described my invention, I claim—

1. In a trolley-catcher, the combination with a spool upon which the trolley-rope is wound, of a spring controlling said spool to keep the trolley-rope taut, and a spring of greater strength to control said spool to draw down the trolley when the latter leaves the wire, mechanism for placing the spool under the control of the stronger spring, and an enlargement on the trolley-rope adapted to actuate said mechanism when said trolley-rope is drawn from the spool by the trolley when the latter leaves the wire, substantially as specified.

2. In a trolley-catcher, the combination with a spool upon which the trolley-rope is wound, of a spring normally controlling said spool to take up the slack in the trolley-rope, a second spring of greater strength controlling said spool to wind down the trolley when the latter leaves the wire, an arm actuated by the trolley-rope when the latter is drawn from the spool by the action of the trolley, and mechanism actuated by said arm to place said spool under the control of the stronger spring, substantially as described.

3. In a trolley-catcher, the combination with a spool, of a spring normally controlling said spool to take up the slack in the trolley-rope, a second spring of greater strength normally disconnected with said spool, a pivotal arm actuated by the trolley-rope when the trolley leaves the wire, mechanism actuated by said arm for connecting the spool with the spring of greater strength, and other mechanism released by said arm whereby the spool is subjected to the action of said spring to lower the trolley, substantially as and for the purposes specified.

4. In a trolley-catcher, the combination with a spool, of a spring normally controlling said spool to take up the slack in the trolley-rope, a spring of greater strength normally disconnected from said spool, clutch members between said spool and latter spring, a support or arm upon which one of said clutch members is supported, a pivotal arm through which the trolley-rope passes from the spool, a projection on said arm to hold or release one of the clutch members, and another projection on said arm to hold or release the support upon which said clutch member is borne, and means on the trolley-rope adapted to move said pivotal arm when the trolley leaves the wire, substantially as specified.

5. In a trolley-catcher, the combination with a spool upon which the trolley-rope is wound, a spring normally disconnected from said spool, clutch devices between said spool and spring, a pivotal arm controlling said clutch devices, the said arm being adapted to receive the trolley-rope as it passes from the spool, and means on said rope for actuating said arm, and thereby permitting the clutch devices to engage, substantially as described.

6. In a trolley-catcher, the combination with a spool, upon which the trolley-rope is wound, a spring normally disconnected from said spool, clutch devices one of which is on the spool-shaft, and the other of which is on the spring-shaft, a support on said spring-shaft for the last-named clutch device, a pivotal arm receiving the trolley-rope as it leaves the spool, a projection on said arm to hold and release the clutch device carried on the support, and another projection on said pivotal arm adapted to hold and to subsequently release the support upon which the said clutch device is borne, and means on the trolley-rope adapted to engage and move the pivotal arm when the trolley leaves the wire, substantially as specified.

7. In a trolley-catcher, the combination with a spool, of a spring normally disconnected therewith, clutch devices for connecting said spring and spool, a pivotal arm actuated by the trolley-rope when the latter is drawn upwardly by the trolley leaving the wire, and means on said pivotal arm adapted to release one of the clutch members and thereby permit a connection between the spool and spring, and further means on said pivotal arm for permitting the spring to expand whereby the spring and spool move in harmony to draw down the trolley-pole when the latter leaves the wire.

In testimony that I claim the foregoing as my own I hereto affix my signature in presence of two witnesses.

OLIVER W. WHITEHEAD.

Witnesses:
R. J. McCarty,
A. J. Fiorini.